United States Patent

Stephenson et al.

[11] Patent Number: 5,871,344
[45] Date of Patent: Feb. 16, 1999

[54] FLASH LAMP ARRAY WITH POROUS VENT

[75] Inventors: Stanley W. Stephenson, Spencerport; Arun K. Mehrotra, Rochester, both of N.Y.

[73] Assignee: Eastman Kodak Company, Rochester, N.Y.

[21] Appl. No.: 788,533

[22] Filed: Jan. 24, 1997

[51] Int. Cl.$^6$ .............................. F21K 5/00; G03B 15/04
[52] U.S. Cl. .................. 431/359; 431/357; 431/361; 431/362; 431/360; 362/11; 362/12; 396/155; 396/191; 396/192
[58] Field of Search .................... 431/357–362, 431/364, 365; 396/155, 191, 192; 362/10–15

[56] References Cited

U.S. PATENT DOCUMENTS

| | | | |
|---|---|---|---|
| 1,179,335 | 4/1916 | Porter | 431/364 |
| 1,780,509 | 11/1930 | Skinner . | |
| 2,197,733 | 4/1940 | Schwarze | 431/361 |
| 2,279,880 | 4/1942 | DeMargitta | 431/358 |
| 2,280,048 | 4/1942 | Schwarze | 431/358 |
| 2,393,711 | 1/1946 | Schwarze | 67/31 |
| 2,892,073 | 6/1959 | Michatek et al. | 340/1.3 |
| 3,280,601 | 10/1966 | Ostrow | 431/365 |
| 3,439,992 | 4/1969 | Schaffer et al. | 431/93 |
| 3,511,586 | 5/1970 | Kopelman et al. | 431/93 |
| 3,540,820 | 11/1970 | Shaffer | 431/93 |
| 3,706,521 | 12/1972 | Kopelman et al. | 431/93 |
| 3,751,656 | 8/1973 | Buckler el al. | 240/1.3 |
| 3,873,260 | 3/1975 | Cote | 431/95 |
| 4,038,020 | 7/1977 | Audesse et al. | 431/358 |
| 4,055,759 | 10/1977 | Bouchard et al. | 362/159 |
| 4,154,569 | 5/1979 | vanWerkhoven | 91/357 |
| 4,233,023 | 11/1980 | Johnson et al. | 431/362 |
| 4,347,053 | 8/1982 | Fohl et al. | 431/359 |

FOREIGN PATENT DOCUMENTS

| | | | |
|---|---|---|---|
| 781865 | 3/1935 | France | 431/358 |
| 781865 | 5/1935 | France . | |
| 667107 | 4/1937 | Germany | 431/364 |
| 679736 | 8/1937 | Germany | 431/365 |
| 679735 | 8/1939 | Germany | 431/365 |

*Primary Examiner*—Ira S. Lazarus
*Assistant Examiner*—David Lee
*Attorney, Agent, or Firm*—Thomas H. Close

[57] ABSTRACT

A compact flash lamp array includes a housing defining a plurality of cavities, with each cavity having a light emitting opening and a combustible mass deposited in each cavity. A firing means such as an electrically heated filament or percussive primer is provided for individually firing the combustible mass in each cavity. Each cavity in the housing is provided with a porous portion communicating to the outside of the cavity having sufficient porosity to maintain cavity integrity during combustion of the combustible mass contained in a cavity while retaining combustion by-products.

14 Claims, 3 Drawing Sheets

FLASH LAMP ARRAY WITH POROUS VENT

CROSS-REFERENCE TO RELATES APPLICATIONS

The present application is related to U.S. application Ser. No. 08/769,338, filed Dec. 19, 1996, by Stanley W. Stephenson, entitled, "Improved Photoflash Particle Mixture"; U.S. application Ser. No. 08/788,005, filed Jan. 24, 1997, by Stanley W. Stephenson, entitled, "Percussively Fired Flash Lamp Array"; and U.S. application Ser. No. 08/744,782, filed Nov. 6, 1996, by Stanley W. Stephenson, entitled "Photo Flash Lamp Array", now patented: U.S. Pat. No. 5,720,610, issued Feb. 24, 1998.

FIELD OF THE INVENTION

The invention relates generally to the field of photography, and in particular to a compact array of flash lamps containing combustible material.

BACKGROUND OF THE INVENTION

Currently available single use cameras with flash illumination are provided with electronic flash. The electronic flash unit is relatively expensive, representing a significant portion on the overall cost of the camera. Although the electronic flash unit may be recovered and recycled a number of times, thereby reducing the effective cost of the electronics, it has been observed that an array of chemical flash lamps could be an attractive alternative to electronic flash in single use cameras and related applications.

U.S. Pat. No. 4,347,053 issued Aug. 31, 1982, to Fohl et al. discloses a flash illumination assembly having a plurality of electrically fired flash lamps located in a circular housing. The combustion products from the individual flash lamps are vented into a common central expansion chamber. One problem associated with such an array of flash lamps is that the combustion products emitted from one of the flash lamps into the common central expansion chamber may ignite others of the flash lamps, thereby causing a "chain fire". Another problem associated with such flash lamp arrays is the relatively loud noise that is generated by the firing of the flash lamp. A still further problem with this arrangement is that combustion products from the fired lamps will enter and fog the unfired lamps.

There is a need therefore for an improved array of flash lamps.

SUMMARY OF THE INVENTION

The present invention is directed to overcoming one or more of the problems set forth above. Briefly summarized, according to one aspect of the present invention, a compact flash lamp array includes a housing defining a plurality of cavities, with each cavity having a light emitting opening and a combustible mass deposited in each cavity. A firing means such as an electrically heated filament or percussive primer is provided for individually firing the combustible mass in each cavity. Each cavity in the housing is provided with a porous portion communicating to the outside of the cavity having sufficient porosity to maintain cavity integrity during combustion of the combustible mass contained in a cavity while retaining combustion by products and substantially muffling the sound from the combustion.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention provides a compact, reliable flash lamp array with reduced noise. The porous venting of the flash lamps according to the present invention eliminates chain fire and prevents the combustion by products from fired flash lamps from fouling adjacent lamps.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
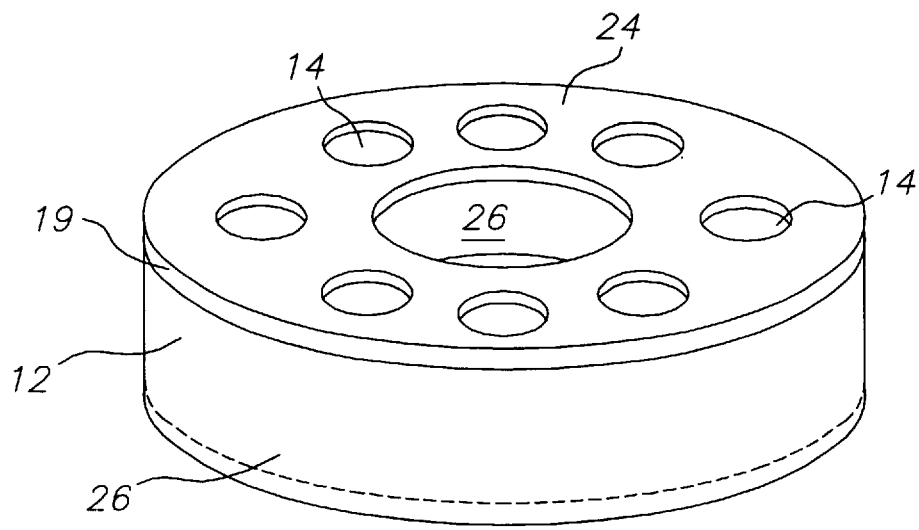
FIG. 1 is a perspective view of a flash lamp array according to the present invention.
Figure 2:
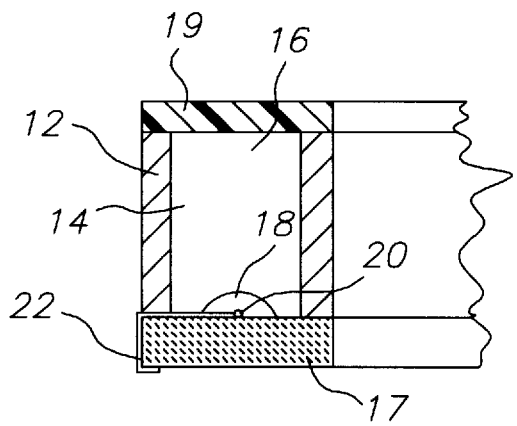
FIG. 2 is a cross sectional view of a flash lamp array shown in FIG. 1, taken along line 2—2, having a porous base with an electrical ignition.
Figure 3:
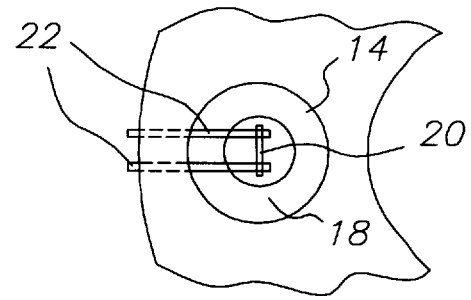
FIG. 3 is a partial top view of the structure shown in FIG. 2.

Referring to FIGS. 1, 2 and 3, the flash lamp array 10 of the present invention includes a circular housing 12 defining a plurality of cavities 14 having a volume of between 0.5 and 1.5 cc. The circular housing 12 is preferably an acrylic polymer loaded with a high concentration of titanium dioxide or other filler that has high reflectivity. Alternatively, the housing 12 is an engineering plastic such as polycarbonate that is vacuum coated with reflective aluminum. Alternatively, the housing 12 may be coated with a highly reflective electroless nickel coating. In a still further alternative, the housing 12 is formed as an aluminum extrunsion that is chemically polished. In a still further alternative, the housing 12 is chemically polished die cast aluminum.

According to the present invention, the cavity 14 includes a porous portion such as the bottom 17 of each of the cavities 14. A combustible mass 18 is deposited at the bottom of each cavity 14. The porous bottom 17 provides a vent from the cavity to the atmosphere which contains the combustion by products of the combustible mass; muffles the sound of the explosion when the combustible mass is ignited; and prevents particulate materials from escaping the cavity 14. A sheet 19 of transparent material is bonded to the top of the housing 12 to cover the cavities 14 in housing 12 and complete the enclosures for the flash lamp array 10. The transparent sheet 19 may be, for example, 1 mm thick glass, 0.5 mm thick glass coated plastic with the glass coating on the inside of the chamber, or 0.5 mm thick acrylic. The transparent sheet 19 is bonded to the housing 12 with an adhesive such as epoxy or silicone rubber.

In a preferred embodiment, the porous bottom 17 is an annular sheet of porous ceramic 2.5 mm thick. A suitable porous ceramic is FAO-5 grade ceramically bonded alumina available from the Ferro Corporation, East Rochester, N.Y. This material has a maximum pore diameter of 40 $\mu$m and a probable nominal particle retention of 5 $\mu$m. The material has a porosity from 20 to 50%, nominally 35%. The particles are bonded ceramically to resist temperatures up to 2000° F. It is also possible to use glass bonded silica which can resist temperatures up to 800° F. Experiments have shown that materials with pore sizes varying from 25 to 120 $\mu$m perform well in this application. The circular housing 12 is bonded to the disc of porous ceramic using an epoxy adhesive.

The combustible mass 18 is ignited by an igniter link 20 that is connected to electrical conductors 22. Electrical conductors 22 may comprise strips of 50 $\mu$m copper foil approximately 1.25 mm wide. The igniter links 20 are 25 $\mu$m diameter copper wire, soldered across the electrical conductors 22. A combustible mass 18 is deposited over each igniter link 20. It has been found to be important to completely cover the igniter link 20 with the combustible mass 18. The electrical conductors 22 are adhesively bonded to the porous bottom 17 using, for example, a contact adhesive. The electrical conductors 22 extend out of cavity 14, around the outer edge and the back of porous bottom 17 where they can be accessed by electrical contacts in a camera.

Preferably, the combustible mass 18 is a mixture of coarsely powdered zirconium (−320 sieve), finely powdered zirconium (5 $\mu$m zirconium dust), an oxidizer such as a chlorate or perchlorate (preferably −200 and+400 sieve potassium perchlorate), and polymeric binder (preferably polyacrilamide (PAA)) all dispersed in water. A mass of 22 to 40 mg (preferably 35 mg) of the resulting slurry are deposited onto the igniter links 20 and oven dried at 90° C. for 24 hours. The resulting combustible mass 18 is capable of ignition with a single alkaline AA battery to produce approximately 120 candela seconds of illumination.

Figure 4:
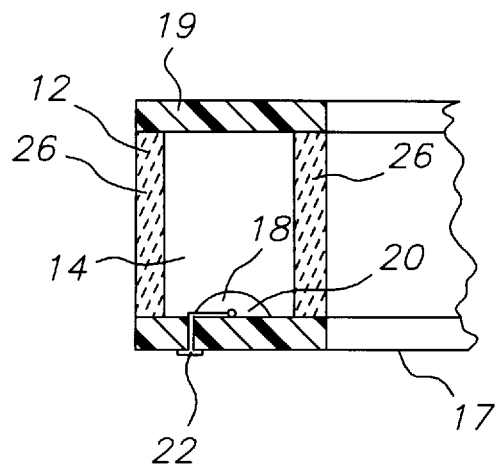
FIG. 4 is a cross sectional view of a flash lamp array shown in FIG. 1, taken along line 2—2, having porous side walls and electrical ignition.

Alternatively, referring to FIG. 4, the housing 12 may be formed of porous ceramic and the bottom 17 may comprise a circuit board having electrical circuit board conductors 22 formed in a conventional manner. The circuit board conductors 22 may pass through the circuit board to form contacts on the back of the flash lamp array 10 using conventional through-hole techniques. The igniter links 20 and combustible masses 18 are assembled directly onto the surface of the circuit board forming bottom 17 of cavity 14. The porous ceramic forming housing 12 is preferably formed from ceramically bonded alumina by molding techniques known in the prior art. Referring to FIG. 1, shared walls 24 between cavities 14 may be formed thicker than the exterior walls 26 to further prevent combustion products from passing between cavities when the walls are formed from the porous ceramic.

Figure 5:
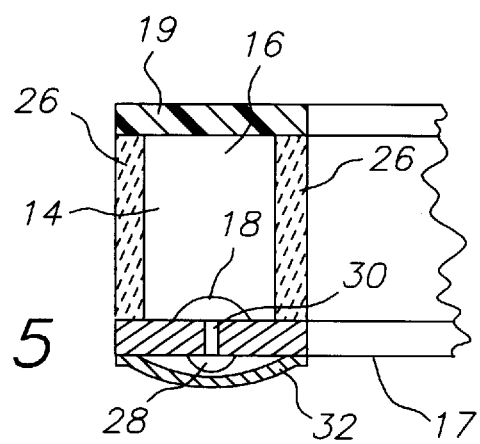
FIG. 5 is a cross sectional view of a flash lamp array shown in FIG. 1, taken along line 2—2, having a porous side walls and percussive ignition.

Referring to FIG. 5, in a configuration similar to that shown in FIG. 4, the combustible mass 18 is ignited by a percussion activated primer mass 28. A primer vent 30 is formed in the bottom 17. Primer mass 28 is deposited on the bottom 17 of the flash array 10 over the primer vent 30 opposite the combustible mass 18. Preferably the primer mass 28 is a mixture of red phosphorus, potassium chlorate, and silicone dioxide powders in a ratio of 1:2:3. An equal mass of water containing 1% PAA binder is combined with the powder mixture to form a primer slurry. 2 to 10 mg of the primer slurry is applied over primer vent 30 and dried at 90° C. for 30 minutes. When dried, the primer mass 28 varies in height between 0.003 and 0.012 inches. Bottom 17 must be sufficiently hard to perform as an anvil for the primer mass 28. It has been found that either aluminum or an engineering plastic such as polycarbonate or conventional circuit board material is sufficiently hard for this purpose.

A primer cover 32 comprising a deformable sheet of material is secured over each primer mass 28 to direct the combustion products of the primer mass 28 through primer vent 30 into cavity 14 to ignite combustible mass 18. Primer cover 32 serves to hold primer mass 28 in place over primer vent 30. Since the height of primer mass 28 varies, primer cover 32 must be malleable enough to accommodate the variations in height while securing primer mass 28, without exerting such force on primer mass 28 that it is detonated. The primer covers 32 are formed of a material that can resist extremely high temperatures and have sufficient thickness to resist rupture from the shock and pressure from detonation of the primer mass. The primer covers must also be able to efficiently transfer impact energy from a firing pin employed to ignite the primer mass 28. The adhesive employed to hold the primer cover over the primer mass must have sufficient adhesion to bottom 17 to resist failure on ignition of primer mass 28.

In one embodiment, the primer cover is an adhesive backed 2 mil aluminum foil (e.g. Scotch 1170 brand aluminum tape available from the 3M Corporation). The adhesive backed foil may be applied in individual patches over each primer mass 28, or a single sheet of adhesive backed foil is applied the back of the housing and secured over the primer masses 28 to separately enclose each mass. The adhesive sheet is applied to the back of the housing with a die that is relieved in the areas of the primer masses 28 and allow the sheet to deform to form tent like covers over the primer masses. Alternatively, 1.4 mil adhesive backed copper foil (e.g. Scotch 1181 brand copper tape available from the 3M Corporation) may be used to form the primer covers. Alternatively, an adhesive such as silicone rubber or an epoxy is applied to the bottom 17 and a metallic foil such as copper or aluminum is secured over the primer masses 28. Preferably, the metal foil is annealed to provide the ductility necessary to form a tent like shape over the primer masses 28 without detonating the primer masses 28.

Figure 6:
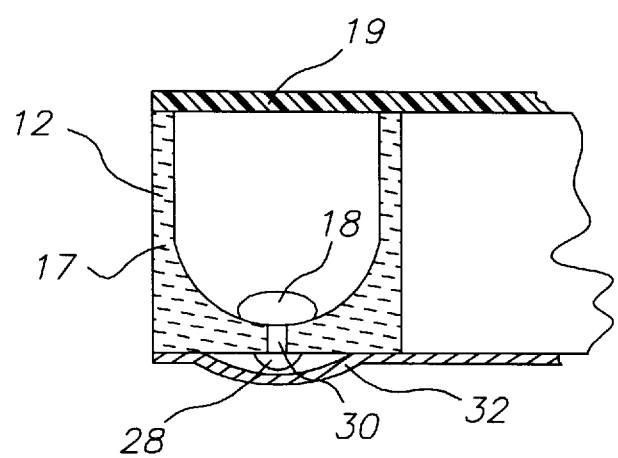
FIG. 6 is a cross sectional view of a flash lamp array shown in FIG. 1, taken along line 2—2, having a porous base and side walls and percussive ignition.

Referring to FIG. 6, in the percussively fired version of the flash lamp array according to the present invention, the housing 12 and bottom 17 may be integrally formed from the porous ceramic material.

Figure 7:
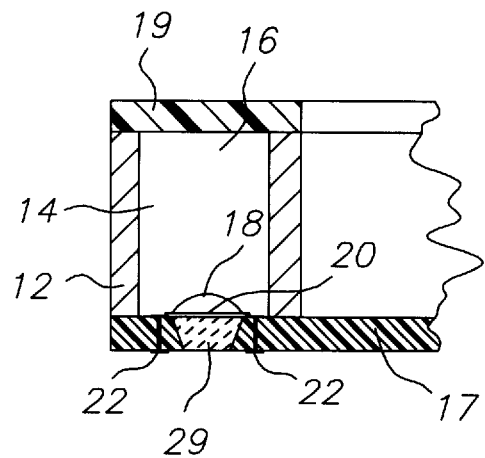
FIG. 7 is a cross sectional view of a flash lamp array shown in FIG. 1, taken along line 2—2, having a porous insert in a circuit board base and electrical ignition.

Referring to FIG. 7, in a further alternative of the electrically fired version of the flash lamp array, the housing 12 is non-porous and the porous portion of the cavity is provided by a porous ceramic insert 29. The porous ceramic insert 29 is tapered to fit into a matching tapered opening in the circuit board forming bottom 17. The ceramic insert is attached to the bottom 17 by an adhesive such as epoxy or silicone rubber. The igniter link 20 extends across the porous ceramic insert 29 and the combustible mass 18 is deposited directly on the porous ceramic insert 29.

Figure 8:
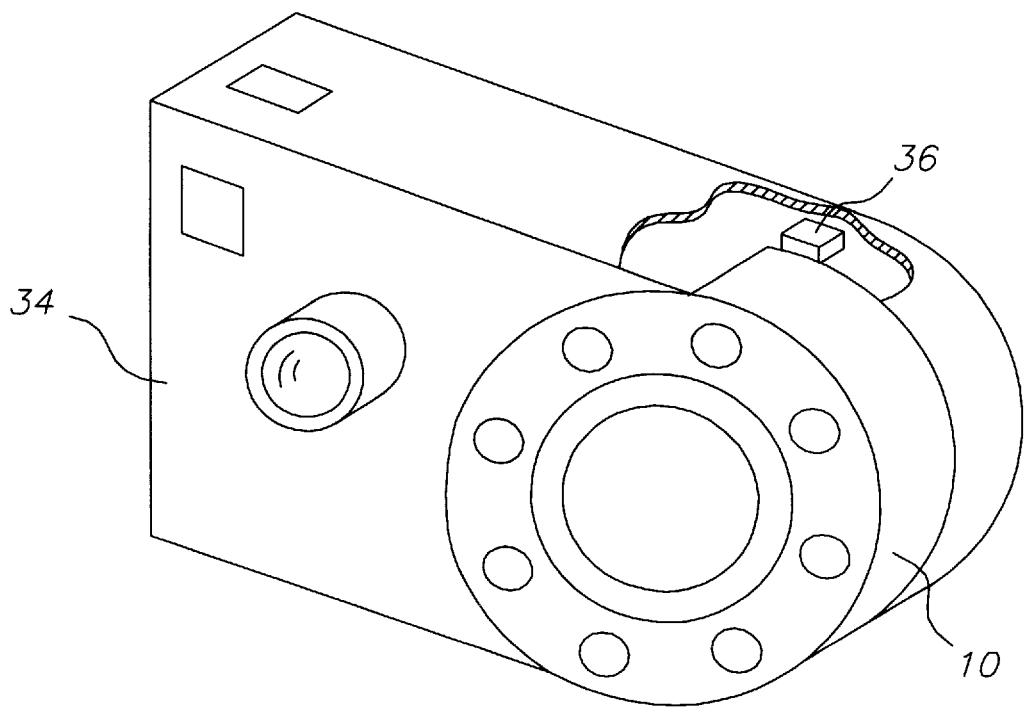
FIG. 8 is a perspective view of a single use camera including a flash array according to the present invention.

As shown in FIG. 8, the flash lamp array 10 according to the present invention may be incorporated in a single use camera 34. The single use camera 34 includes a flash mechanism 36, such as an electrical circuit with contacts for applying current to the electrical conductors 22 in the case of the electrically fired flash lamp array, or a mechanically operated firing pin associated with a shutter mechanism (not shown) in the case of the percussively fired flash lamp array as is known in the prior art. The camera 34 includes a mechanism (not shown) to rotate flash lamp array 10 after each exposure of the camera 40 to place an unfired flash in position to be fired by flash firing mechanism 36.

The invention has been described with reference to a preferred embodiment. However, it will be appreciated that variations and modifications can be effected by a person of ordinary skill in the art without departing from the scope of the invention.

We claim:

1. A compact flash lamp array, comprising:
   a) a housing defining a plurality of cavities, each cavity having a light emitting opening;
   b) a transparent cover fixed over the light emitting opening;
   c) a combustible mass deposited in each cavity;
   d) means for individually firing the combustible mass in each cavity; and
   e) each cavity in the housing having a porous portion comprising a porous ceramic communicating to the outside of the cavity having sufficient porosity to maintain cavity integrity during combustion of the combustible mass contained in a cavity while retaining combustion by products and substantially muffling the sound from the combustion.

2. The compact photoflash lamp array claimed in claim 1, wherein the means for firing the combustible mass is an electrically heated element.

3. The compact photoflash lamp array claimed in claim 1, wherein the means for firing the combustible mass is a percussively fired primer.

4. The compact flash lamp array claimed in claim 1, wherein the combustible mass is located on the porous portion of the cavity.

5. The compact flash lamp array claimed in claim 1, wherein the porous portion of each cavity is 0.1 inch thick, 0.5 inch in diameter 20 to 50 micron pore size, and 25–50% density.

6. The compact flash lamp array claimed in claim 4 wherein the entire housing is a porous material.

7. The compact flash lamp array claimed in claim 2, wherein the walls of the housing is a porous ceramic and the bottom of the cavity is a circuit board bearing the electrically heated element and combustible mass.

8. The compact flash lamp array claimed in claim 2, wherein the bottom of the cavity is a circuit board and the porous portion of the cavity is a porous insert in the circuit board.

9. The compact flash lamp array claimed in claim 1, wherein the sheet of transparent material is glass.

10. The compact flash lamp array claimed in claim 1, wherein the sheet of transparent material is clear acrylic plastic.

11. The compact flash lamp array claimed in claim 1, wherein the sheet of transparent material is glass coated plastic.

12. The compact flash lamp array claimed in claim 1, wherein the combustible mass is finely divided zirconium powder and potassium perchlorate in polymeric binder.

13. The compact flash lamp array claimed in claim 3, wherein the percussively fired primer is a mixture of red phosphorus, potassium chlorate, and silicone ioxide powders in a ratio of 1:2:3.

14. The compact flash lamp array claimed in claim 1, wherein the flash amp array is an integral part of a single use camera.

* * * * *